United States Patent
Willardson

(10) Patent No.: US 7,133,409 B1
(45) Date of Patent: *Nov. 7, 2006

(54) PROGRAMMABLE PACKET FILTERING IN A PRIORITIZED CHAIN

(76) Inventor: Richard Willardson, 9515 NW. Fleischner St., Portland, OR (US) 97229

( * ) Notice: Subject to any disclaimer, the term of this patent is extended or adjusted under 35 U.S.C. 154(b) by 1045 days.

This patent is subject to a terminal disclaimer.

(21) Appl. No.: 09/910,116

(22) Filed: Jul. 19, 2001

(51) Int. Cl.
    *G06F 7/02* (2006.01)
(52) U.S. Cl. ............ 370/401; 310/389; 711/108; 707/6
(58) Field of Classification Search .......... 370/355, 370/465, 466, 432, 351, 352, 401, 402, 403, 370/411, 412, 428, 389, 392; 711/108; 712/300; 707/6
    See application file for complete search history.

(56) References Cited

U.S. PATENT DOCUMENTS

| | | | |
|---|---|---|---|
| 5,805,855 A | 9/1998 | Liu | |
| 5,842,040 A | 11/1998 | Hughes et al. | |
| 5,903,559 A * | 5/1999 | Acharya et al. | ............ 370/355 |
| 6,181,699 B1 | 1/2001 | Crinion et al. | |
| 6,289,414 B1 | 9/2001 | Feldmeier et al. | |
| 6,374,326 B1 | 4/2002 | Kansal et al. | |
| 6,467,019 B1 | 10/2002 | Washburn | |
| 6,484,170 B1 | 11/2002 | Abdat | |
| 6,732,228 B1 * | 5/2004 | Willardson | ............ 711/108 |
| 2002/0126672 A1 | 9/2002 | Chow et al. | |
| 2002/0163909 A1 | 11/2002 | Sarkinen et al. | |
| 2003/0167390 A1 * | 9/2003 | Gorman et al. | ............ 712/300 |

OTHER PUBLICATIONS

Azgomi, Sherri, Using Content-Addressable Memory for Networking Applications, http://www.csdmag.com/maing/1999/11/9911feat3.htm, Nov. 1999, printed Dec. 1, 2000, 11 pages.

* cited by examiner

*Primary Examiner*—Ajit Patel
(74) *Attorney, Agent, or Firm*—Berkeley Law & Technology Group

(57) ABSTRACT

An apparatus is equipped with classifier logic to programmably extract key data from a data packet of a data stream based upon a dynamically programmable offset, compare the key data with one or more lookup tables of key entries, and store the result of the comparison as at least part of a categorization vector. The apparatus is further equipped with filter logic coupled to the classifier logic to receive the categorization vector and to programmably determine group membership of the data packet based at least in part upon the categorization vector, as well as to dynamically determine a disposition for the data packet based at least in part upon the group membership.

27 Claims, 7 Drawing Sheets

PROGRAMMABLE PACKET FILTERING IN A PRIORITIZED CHAIN

BACKGROUND OF THE INVENTION

1. Field of the Invention

The present invention relates to the field of networking. More specifically, the present invention relates to programmable packet filtering in a prioritized chain.

2. Background Information

The Internet may be characterized as a global network of networks through which countless devices communicate electronically. In a typical exchange of information between two or more devices connected to a large network such as the Internet, data from a source device for example, will likely propagate through numerous switching devices prior to the data reaching one or more designated destination devices. In order to determine where the data should be forwarded to next, certain such intermediate switching devices inspect the data at various points throughout the transmission to determine the respective source and destination addresses of the sender and recipient(s). In order to ascertain intermediate forwarding addresses for the data, some switching devices rely on previous transmissions between identical source and/or destination devices, whereas other switching devices reference routing tables in order to ascertain the intermediate forwarding address. In any event, the time with which it takes for the data to be received at the destination device after being transmitted from the source device is proportional to the speed at which the network operates including the time it takes for the data to propagate through each network switching device.

As the number of devices communicating over the Internet continues to exponentially increase, the volume and complexity of the data transmitted correspondingly continues to increase. Accordingly, networks that were considered to be the fastest of their kind only a few years ago are now considered by many to be too slow to handle modern communication requirements. As new network transport mediums such as fiber optics continue to replace legacy copper-wire networks for example, new data communication performance metrics are continually being achieved. Unfortunately however, as network performance continues to increase, the operational performance of intermediate switching devices connected to such networks must correspondingly increase so as not to become the bottleneck affecting network performance.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention. Further, the description repeatedly uses the phrase "in one embodiment", which ordinarily does not refer to the same embodiment, although it may.

Overview

Figure 1:
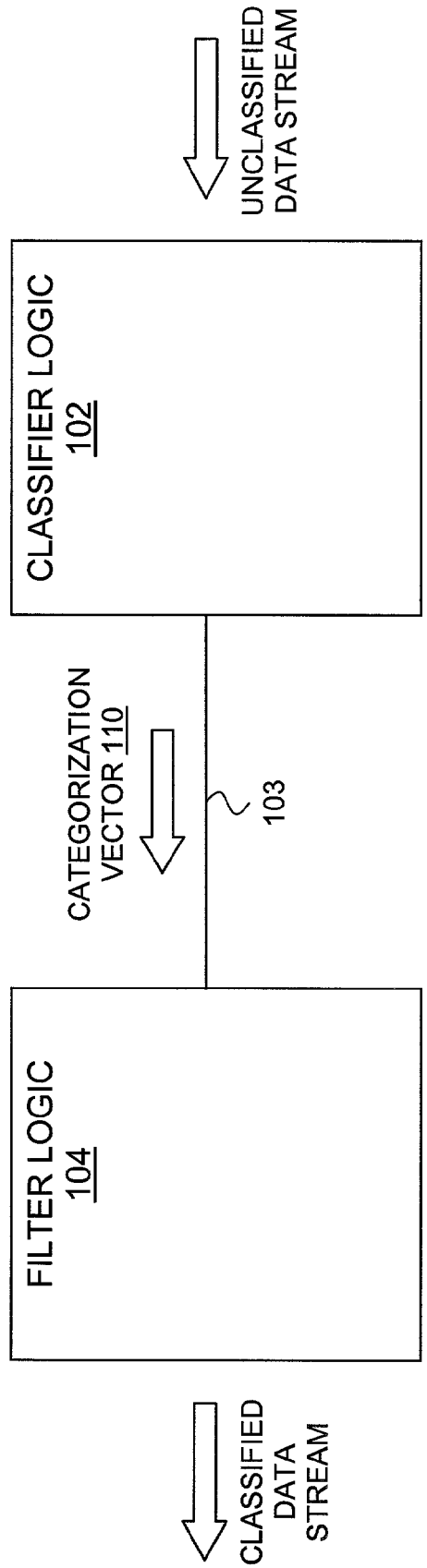
FIG. 1 illustrates an overview of the present invention including classifier logic and filter logic in accordance with one embodiment.

Referring now to FIG. 1, wherein an overview of the present invention is illustrated. As shown, classifier logic 102 and filter logic 104 are coupled to each other via communication link 103 over which classifier logic 102 may transmit data, including categorization-based data to filter logic 104. Classifier logic 102 is equipped with key extraction logic to programmably extract key data from data packets of input data streams. Classifier logic 102 is further equipped to compare extracted key data to key entries programmed in one or more lookup tables to reflect packet-filtering rules representing such things as admission policies. In one embodiment, the lookup tables are equipped with programmable nybble masks, which may be selectively programmed to mask all or a portion of the extracted key data. If the key data is found to match a key entry within a lookup table, a corresponding key tag stored in association with the key entry is then stored (e.g., in a register) to form at least a portion of a categorization vector, such as categorization vector 110. If, however, the key data does not match any key entry in a lookup table, a binary "0" or equivalent value is stored to indicate such. Moreover, if the extracted key data matches a key entry in more than one lookup table, the corresponding key tags associated with those matching key entries are also stored as part of categorization vector 110. Once categorization vector 110 is determined, it is then forwarded to filter logic 104 via communication link 103.

Filter logic 104 includes logic to programmably determine group membership of said data packet based upon the content of the categorization vector, and to dynamically determine how the data packet should be handled based at least in part upon the group membership. In one embodiment, filter logic 104 includes cascaded combinational logic in the form of N priority encoded packet filters and one default filter. In one embodiment, each packet filter includes function logic, polarity logic, and action logic, whereas the default filter merely includes action logic. In one embodiment, each of the packet filters compares the categorization vector with a programmable value string and a programmable mask string based upon the function specified by the function logic and based upon whether a comparison match or miss is specified by the polarity logic. In one embodiment, for each of the packet filters meeting the criteria specified by the function logic and the polarity logic, a programmable action, such as pass, drop, and divert is selected so as to determine the final disposition of the data packet.

As will be discussed in further detail below, such an advantageous categorization and filtering arrangement of the present invention facilitates highly flexible prioritized filtering of extracted data at wire speed.

Classifier Logic

Figure 2:
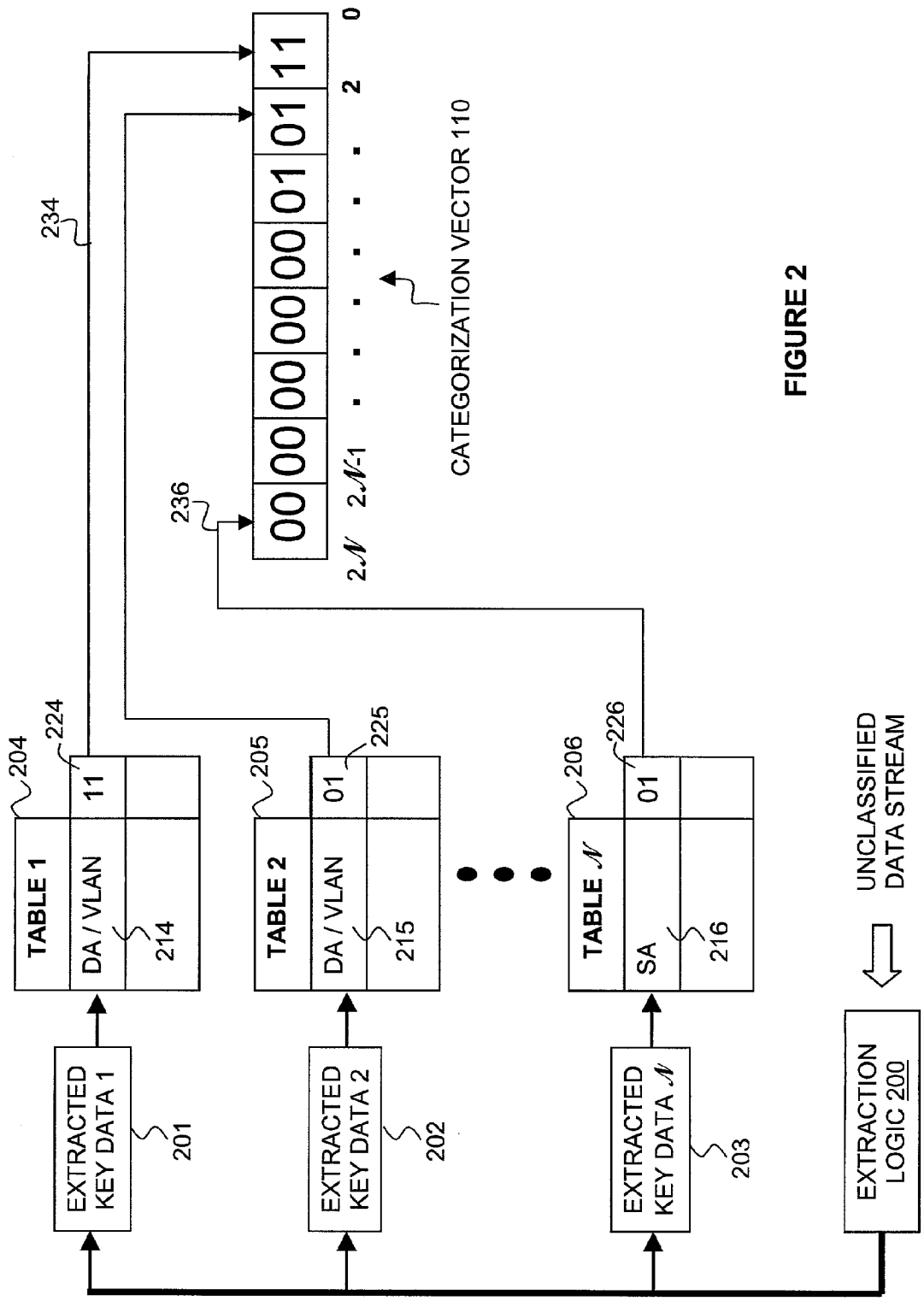
FIG. 2 illustrates a detailed view of classifier logic and a categorization vector of the present invention in accordance with one embodiment.

FIG. 2 illustrates classifier logic 102 and a categorization vector in accordance with one embodiment of the invention. Classifier logic 102 includes key extraction logic 200 to extract key data (201–203) from a data packet stream based upon a dynamically programmable offset, and compare such key data with key entries (214–216) stored within one or more lookup tables (204–206). In order to facilitate concurrent extraction of multiple data keys, extraction logic 200 utilizes a number of pointers and registers to track and store packet-related information such as multiple offset values, start of packet (SOP) and end of packet (EOP) indicators, and virtual local area network (VLAN) tag information for use in association with one or more data packets or frames.

Figure 7:
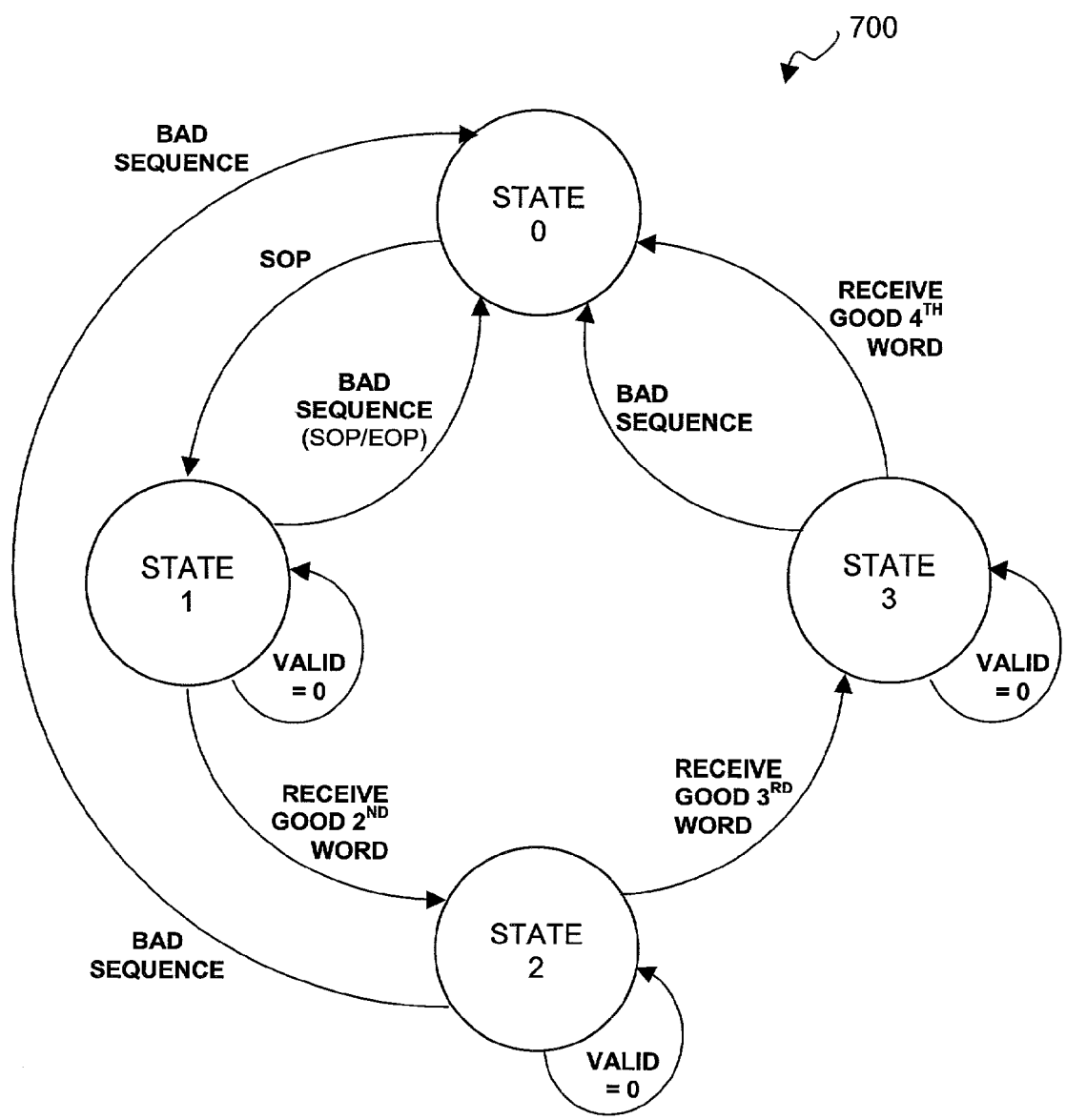
FIG. 7 is a state diagram illustrating operation of one embodiment of extraction logic for use in association with the present invention.

In one embodiment of the invention, four words of data from the incoming data stream are gathered in a gathering register prior to the extraction of the key data. In one embodiment, a state machine is responsible for determining where the next incoming word is to be written in the gathering register. FIG. 7 shows a state diagram illustrating the operation of one embodiment of the extraction logic. Referring to FIG. 7, state machine 700 is shown having four states (1–4). In the illustrated embodiment, state machine 700 gathers the first four valid words of a newly received packet in a register. Once a start of packet indicator is detected in the data, it is shifted to the top of the register (i.e., offset=00000) and all other incoming words are offset from that point. Once the four words are gathered, the data keys are extracted. If, however, another SOP is received before all four words are gathered, then this results in an error condition and no data keys are extracted for transmission to lookup tables 204–206. Rather, a default value (e.g., "00") is issued automatically without accessing the lookup tables. Similarly, if an EOP occurs before four words are received, then the default value is also issued automatically without accessing the lookup tables. Furthermore, state machine 400 will remain in each state for as long as no valid data is received. Once valid data is detected, state machine 400 progresses to the next state.

The lookup tables may be programmed (i.e. through a simple software interface), to define packet filtering rules that will influence packet disposition. For example, group memberships may be defined to influence which packets are passed from one network segment to another, which packets are diverted to a host processor or other device for further processing, and which packets are dropped from the network based upon group membership principles. In a simple case a network administrator might configure a switching device to allow data originating from a first set of devices from within the organization (i.e. members of a first group) to pass through the device, while blocking other data that originated from one or more devices external to the organization (i.e., members of a second group). In a more complex situation, an administrator may wish to configure the switching device to only pass data transmitted to a particular destination address unless the data originates from a specific source address, and so forth.

By performing automatic and programmable combinational logic-based comparisons on the categorization vector, a determination may be made as to the final disposition of each data packet based at least in part upon the previously programmed packet filtering rules. In one embodiment, each key entry (214–216) stored within the one or more lookup tables (204–206) is associated with a corresponding key tag (224–226) such that when the extracted key data matches a key entry in a lookup table the corresponding key tag is output. If the key data does not match any key entry in any lookup table, a binary "0" or equivalent value is output. In one embodiment, the key tag comparison results are concatenated together to form a categorization vector.

In one embodiment, each of lookup tables 204–206 corresponds to one or more bit positions in the resulting categorization vector. For example, key entry 214 represents a destination address and VLAN tag that is stored within lookup table 204 along with corresponding key tag 224. If extracted key data 201 matches key entry 214, key tag 224 is output and stored as part of categorization vector 110 as indicated by arrow 234. If, on the other hand, extracted key data 201 does not match a key entry in a particular lookup table, such as lookup table 206 for example, a logical zero is instead stored in categorization vector 110 as indicated by arrow 236. In one embodiment, one or more of lookup tables 204–206 include a programmable nybble mask (not shown) to selectively mask all or a portion of the extracted key data prior to comparison with the key data of lookup tables 204–206.

Although key tags 224–226 are each shown as being 2-bits wide, the bit-widths of key tags 224–226 is implementation specific and thus may be greater or less than 2-bits. For example, the key tags may include additional bits that may by utilized to assign a priority for a particular packet. The extra bits would be included within the categorization vector to indicate the associated packet's relative priority. Similarly, a variable number (N) of lookup tables may be utilized in conjunction with the invention. In the case where N lookup tables having 2-bit wide key tags are utilized, as is illustrated in FIG. 2, the resulting categorization vector will be 2N-bits in length with each consecutive 2-bit grouping of the categorization vector corresponding to one of the lookup tables.

In one embodiment, the key entries and corresponding key tags are stored in one or more content addressable memories (CAMs). Additional information pertaining to the classifier logic including data extraction logic and the use of on-chip CAMs for packet tagging is described in co-pending U.S. patent application Ser. No. 09/910,119, entitled "Multi-Protocol Data Classification Using On-Chip CAM" filed contemporaneously with the present application, which is hereby fully incorporated by reference.

Filter Logic

Figure 3:
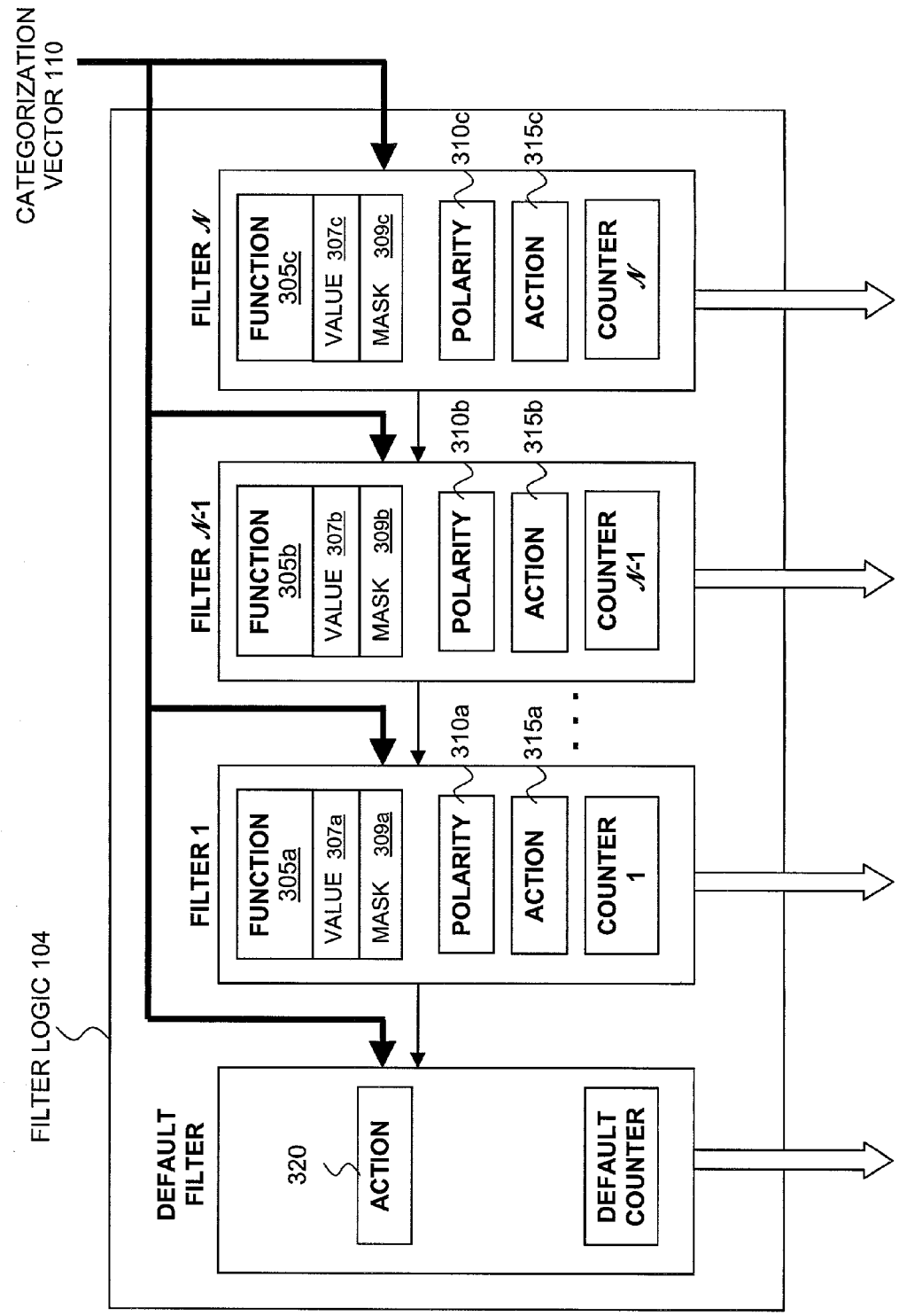
FIG. 3 illustrates a detailed view of filter logic of the present invention in accordance with one embodiment.

Once the categorization vector is formed based upon the key tags resulting from the comparison between the extracted key data and the lookup table, the categorization vector is forwarded to filter logic 104 for filter processing. In FIG. 1, filter logic 104 is shown coupled to classifier logic 102 to receive categorization vector 110 and to programmably determine the disposition of a received data packet based at least in part upon the contents of categorization vector 110. FIG. 3 illustrates a more detailed view of filter logic 104 in accordance with one embodiment of the invention. As shown in FIG. 3, filter logic 104 includes a variable number (N) of packet filters coupled together in a cascaded fashion, and one default filter coupled to the N cascaded packet filters. Each of the packet filters, includes function logic 305, polarity logic 310, action logic 315, and counter logic. The default filter, however, merely includes action logic 320 and counter logic.

Function logic 305 includes value logic 307 and mask logic 309 to perform comparisons between the categorization vector and one or more data strings stored in value logic 307 and mask logic 309. Action logic 315 specifies an action to be taken with respect to the data packet. For example, action logic 315 may specify whether the data packet should be dropped, passed, or diverted based upon the outcome of one or more logical operations (i.e., comparisons) performed between categorization vector 110 and data strings specified by value logic 307 and mask logic 309. Polarity logic 310 includes logic to indicate whether the action specified by action logic 315 should be taken based upon a match condition or a miss condition resulting from such comparisons between categorization vector 110 and the data strings.

In one embodiment, categorization vector 110 is passed in parallel to each of the packet filters of filter logic 104. In one embodiment of the invention, filters 1 to N are priority encoded such that one filter is given precedence over all other filters in determining the action to be taken with respect to the data packet. In one embodiment, the highest numbered filter is given the highest priority, and the default filter is given the lowest priority. Optionally, any one or more of the priority encoded filters may be disabled such that the disabled filter takes no action with respect to the data packet. In the event that none of the filters take an action, whether due to a particular filter being disabled or due to specified criteria within a particular filter not being satisfied, the default filter will then dispose of the data packet. In one embodiment, function logic 305 and polarity logic 310 may be dynamically reconfigured with new comparison criteria while the respective filter containing the logic is disabled.

In the illustrated embodiment, filter logic 104 further contains counter logic, including at least one counter for each of the packet filters (1 to N) in addition to the default filter. Each of the counters within the filter logic 104 is configured to independently increment when the action logic (e.g. 315 or 320) of a corresponding packet filter has dictated an action. If no filters have dictated an action, the default counter is incremented instead. Through the use of such counters, it is possible to trigger an interrupt where, in the case of a divert action, the host bus is interrupted to prepare for a transfer of the data packet from the packet filter to a host processor for further processing by the system.

Filter Functionality

As mentioned above, filter logic 104 includes N priority encoded packet filters along with one default filter. In one embodiment, categorization vector 110 is passed in parallel to all the priority encoded filters (including the default filter), which perform one or more combinational logic based operations on categorization vector 110 to determine the disposition of the data packet. In one embodiment of the invention, function logic 305, further includes independently programmable value logic 307 and independently programmable mask logic 309 to store programmable value data and logic to store programmable mask data respectively. Each filter's value data and mask data are used together to compare expected values (as determined e.g. by a system administrator) against the values represented by categorization vector 110. Each packet filter in which the categorization vector satisfies the specified criteria is then enabled. If the categorization vector does not satisfy the criteria set forth in any of the packet filters, then the default filter disposes of the data packet. In one embodiment, the enabled packet filter having the highest relative priority is selected to dispose of the data packet.

In an alternative embodiment, categorization vector 110 is first compared against criteria stored within the filter assigned to have the highest priority (e.g., filter N in FIG. 3). If categorization vector 110 does not satisfy the criteria in the highest priority filter, then categorization vector 110 is forwarded on to the filter with the next highest priority (e.g., filter N−1 in FIG. 3) for further inspection. The same process is repeated by each priority encoded filter within filter logic 104 in order of assigned priority until either an action is dictated by a filter, or categorization vector 110 reaches the default filter. Upon receiving categorization vector 110, the default vector automatically dictates how the data packet should be handled based upon the action programmed within action logic 320 of the default filter, for example.

Figure 4:
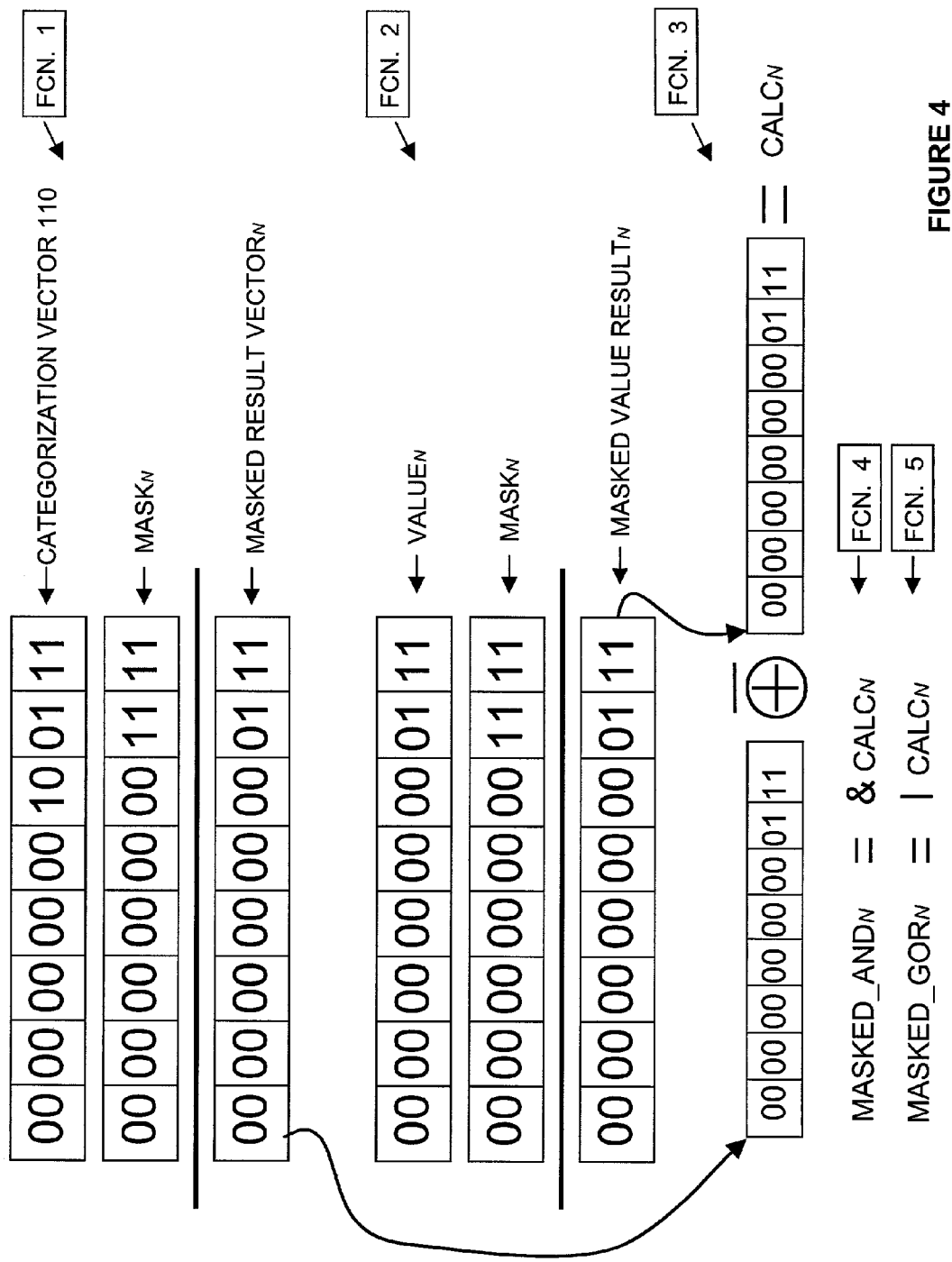
FIG. 4 is a graphical illustration of various combinational logic functions for implementing one embodiment of the present invention.

FIG. 4 is a graphical illustration of various combinational logic functions that may be used to implement the present invention, in accordance with one embodiment. Referring to Function 1 of FIG. 4, categorization vector 110 is compared with programmable mask data (MASKN) resulting in a masked result vector. In one embodiment, a logical AND operation is used to compare categorization vector 110 and the programmable mask data. In accordance with one embodiment of the invention, each priority encoded filter is equipped with its own programmable mask data, which may be stored in mask logic 309, for example.

Referring now to Function 2 of FIG. 4, the programmable mask data from Function 1 is also compared to programmable value data (VALUEN), resulting in a masked value result. In one embodiment, each priority encoded filter is equipped with its own programmable value data, which may be stored in value logic 307 for example. In one embodiment, a logical AND operation is used to compare the programmable mask data with the programmable value data.

Once the masked result vector and the masked value result are determined (through e.g. combinational logic), the values are XNOR'd (exclusive NOR'd) with each other to determine if the two results are equivalent. The result of this equivalence comparison is assigned the label CALCN, as illustrated by Function 3. In one embodiment, each of Functions 1, 2 and 3 are performed by each of the priority encoded packet filters present within filter logic 104 in order of priority and until an action is determined. It should be noted that such combinational functions may be combined into a fewer number of operations and have been presented as separate and distinct functions merely for illustrative purposes.

In addition to function logic 305 including programmable value data and programmable mask data, function logic 305 also specifies at least one combinational function that may be selectively performed against the result of the value data and mask data comparisons (e.g., Function 3). In one embodiment, a masked-AND function and a masked-GOR (group OR) function are specified as shown by Functions 4 and 5 of FIG. 4, respectively. The masked-AND function determines if the indicated value data exists within a specified lookup table, whereas the masked-GOR function determines if the indicated value data exists in any of the lookup tables. Although not pictured, additional combinational functions may nonetheless be specified by function logic 305.

Depending upon the settings of polarity logic 310, for example, a packet filter may dictate an action based upon either a match condition or a miss condition resulting from the outcome of one or more comparisons performed between categorization vector 110 and the data stored in at least one of value logic 307 and mask logic 309. For example, if polarity logic 310 is set to a first polarity, a match will result if the outcome of the one or more comparisons is the same as an expected result, whereas a miss will occur if the outcome of the one or more comparisons is different from an expected result. Conversely, if polarity logic 310 is set to a second polarity, a miss will result if the outcome of the one or more comparisons is the same as an expected result, whereas a match will occur if the outcome of the one or more comparisons is different from an expected result.

Figure 5:
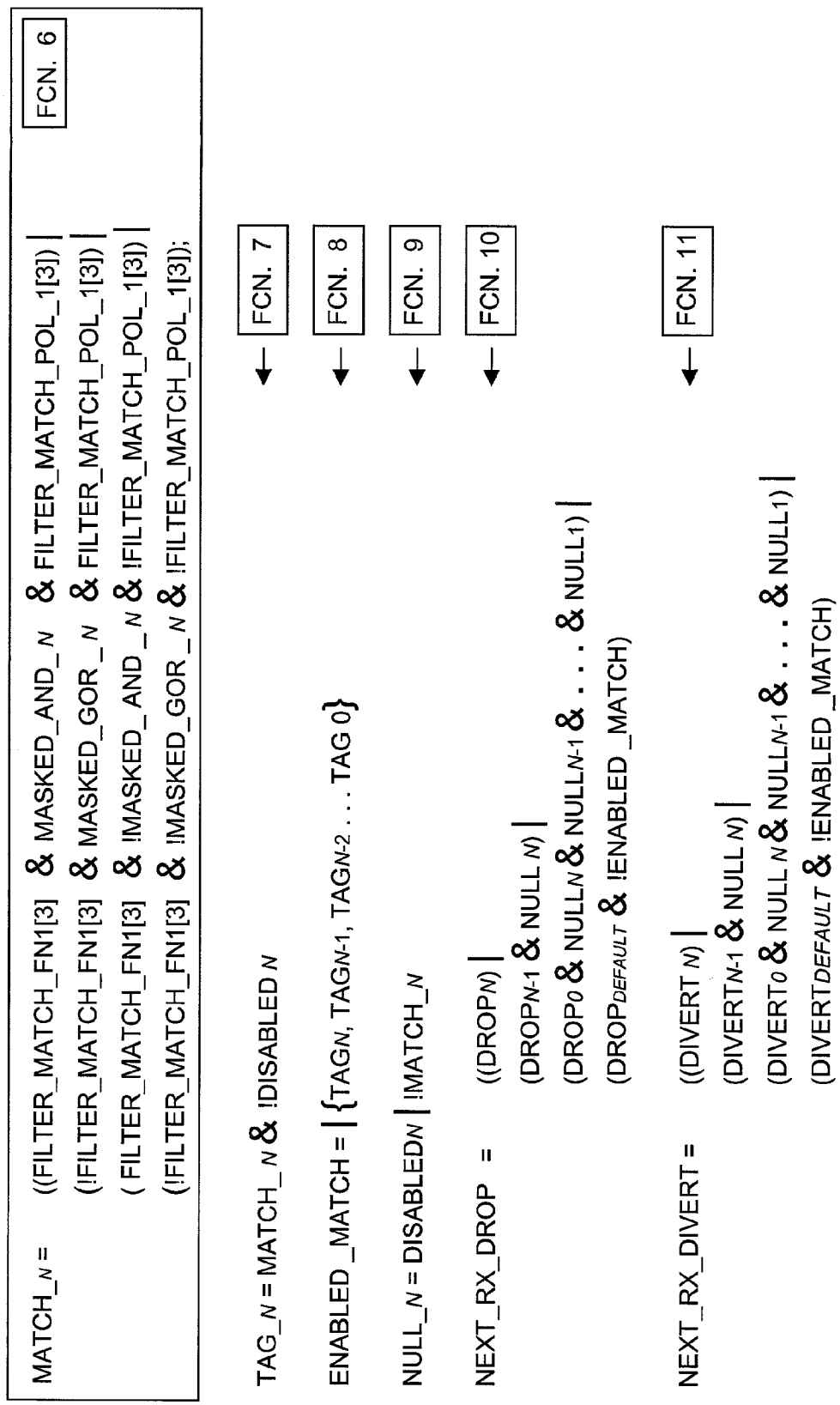
FIG. 5 is a second graphical illustration of various combinational logic functions of the present invention, in accordance with one embodiment.

FIG. 5 is a second graphical illustration of various additional combinational logic functions that may be used to implement the present invention, in accordance with one embodiment. Referring now to Function 6 of FIG. 5, an exemplary match operation is set forth in which various constraints are provided for determining what constitutes a match. For example, according to Function 6, a match will result if at least one bit of a register (e.g., FILTER_MATCH_FN1[3]) indicates that a masked-AND operation is selected, the selected masked-AND operation results in a logical "1", and the polarity of the operation is set to match upon receiving an expected outcome. According to Function 6, a match will also result if FILTER_MATCH_FN1[3] indicates a masked-GOR operation is selected, the selected masked-GOR operation results in a logical "1", and the polarity of the operation is set to match upon receiving an expected outcome. Similarly, a match will also result if FILTER_MATCH_FN1[3] indicates a masked-AND operation is selected, the selected masked-AND operation results in a logical "0", and this time the polarity of the operation is set to match upon not receiving an expected outcome, and so forth.

Function 7 of FIG. 5 illustrates a logic statement which sets a tag for each filter that results in a match and is not disabled, whereas Function 9 sets a null tag for each filter that is either disabled or does not result in a match, and Function 8 enables a match signal upon any of the various tag signals becoming asserted.

Lastly, Functions 10 and 11 of FIG. 5 illustrate drop logic and divert logic respectively. In Function 10, the NEXT_RX_DROP signal will be asserted if either (a) the first enabled priority encoded packet filter dictates a drop action, (b) no priority encoded packet filters are enabled and the default filter action (320) is set to "drop", or (c) if no enabled priority encoded packet filter has any form of a match and the default filter action is set to "drop". Function 11 is similar to Function 10, except Function 11 address the divert action rather than the drop action.

Example Application

Figure 6:
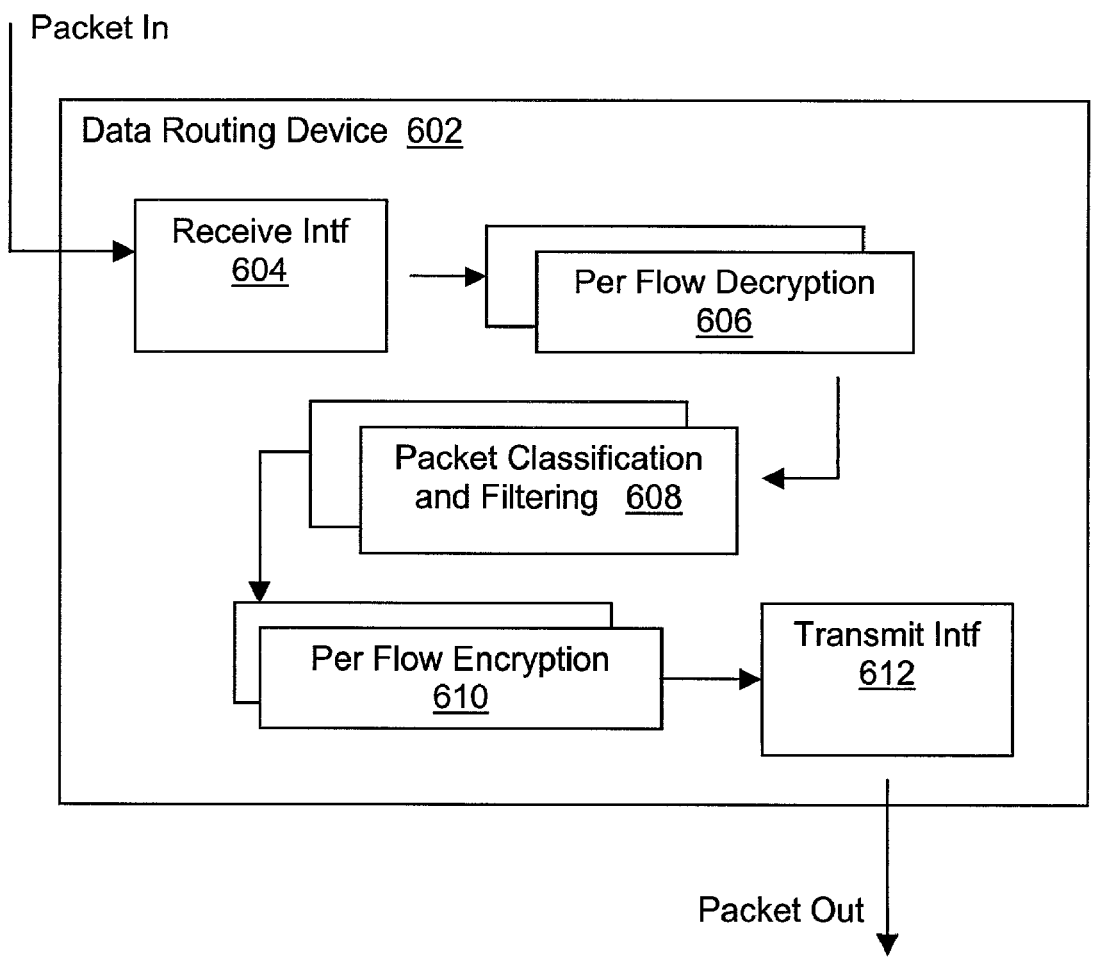
FIG. 6 illustrates an example routing device incorporated with teachings of the present invention.

FIG. 6 illustrates an example application of the present invention. As illustrated, data routing device 602 comprising receive interface 604 and transmit interface 612 is advantageously provided with a number of decryption functions 606 and a number of encryption functions 610 as well as packet classification and filtering functions 608 of the present invention. Decryption functions 606 and encryption functions 610 are provided to perform decryption and encryption for a number of network traffic flows, one each for a network traffic flow. More specifically, decryption functions 606 and encryption functions 610 are able to advantageously generate the deciphering/ciphering round keys in a pipelined and as needed manner as is described in co-pending U.S. patent application Ser. No. 09/836,965 entitled "Pipelined Deciphering Round Keys Generation" filed contemporaneously with the present application, and is hereby fully incorporated by reference.

Packet classification and filtering functions 608 facilitate data routing by analyzing and processing key data extracted from packets of a data packet stream as described above. The flexibility provided through such classification and filtering functions alone, or in combination with decryption functions 706 and encryption functions 710 facilitate the handling of high speed data line rates for multiple data flows by data routing device 702. In one embodiment, data routing device 702 is an IC component for routing packets transmitted over an optical medium onto an electrical medium at very high speed.

CONCLUSION AND EPILOGUE

Thus, it can be seen from the above descriptions, a novel method and apparatus for programmable packet filtering has been described. While the present invention has been described in terms of the above-described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. An apparatus comprising:
classifier logic to programmably extract key data from a data packet of a data stream based at least in part upon a dynamically programmable offset, compare said key data with one or more lookup tables of key entries, and store the result of said comparison as at least part of a categorization vector; and
filter logic coupled to the classifier logic to receive said categorization vector and to programmably determine group membership of said data packet based at least in part upon said categorization vector, and to dynamically determine a disposition for said data packet based at least in part upon said group membership.

2. The apparatus of claim 1, wherein at least one of said one or more key entries is unique.

3. The apparatus of claim 1, wherein said filter logic comprises cascaded logic representing N priority encoded filters and a default filter to determine said group membership.

4. The apparatus of claim 3, wherein said one or more lookup tables comprises N content addressable memories.

5. The apparatus of claim 3, wherein one or more of said priority encoded filters comprises function logic to specify at least one combinational operation to apply to the categorization vector, and action logic to dictate an action for said data packet based at least in part upon the outcome of said at least one combinational operation.

6. The apparatus of claim 5, wherein said function logic further comprises logic to store programmable value data, logic to store programmable mask data, and logic to perform one or more comparisons between said categorization vector and at least one of said programmable value data and said programmable mask data.

7. The apparatus of claim 5, wherein one or more of said priority encoded filters further comprises polarity logic to determine whether said action is to be dictated based at least in part upon the outcome of said one or more comparisons resulting in a match condition, or whether said action is specified based at least in part upon the outcome of said one or more comparisons resulting in a miss condition.

8. The apparatus of claim 5, wherein said combinational operation comprises a masked-AND operation.

9. The apparatus of claim 5, wherein said combinational operation comprises a masked-GOR operation.

10. The apparatus of claim 5, wherein said default filter comprises default action logic for determining the disposition of said data packet if said action logic of said priority encoded filters does not dictate an action.

11. The apparatus of claim 10, wherein said plurality of filter actions include a packet drop action, a packet divert action, and a packet pass action.

12. The apparatus of claim 11, wherein if said drop action is specified, said data packet is dropped from said data stream.

13. The apparatus of claim 11, wherein if said divert action is specified, said data packet is diverted from said data stream to a host processor for processing.

14. The apparatus of claim 11, wherein if said pass action is specified, said data packet is passed through said priority encoded filter as part of an output data stream.

15. The apparatus of claim 1, wherein said filter logic is adapted to determine a priority for said packet based at least in part upon said categorization vector.

16. A method comprising:
extracting key data from a data packet of a data stream based at least in part upon a dynamically programmable offset,
comparing said key data with one or more lookup tables of key entries, and storing the result of said comparison as at least part of a categorization vector;
determining group membership of said data packet based at least in part upon said categorization vector, and
dynamically determining a disposition for said data packet based at least in part upon said group membership.

17. The method of claim 16, wherein at least one of said one or more key entries is unique.

18. The method of claim 16, wherein said determining said group membership of said data packet further comprises performing one or more comparisons of said categorization vector against one or more dynamically programmable Boolean values.

19. The method of claim 18, wherein said performing one or more comparisons comprises performing one or more Boolean operations.

20. The method of claim 19, wherein said Boolean operations comprise at least one of a masked-AND and/or a masked-GOR operation.

21. The method of claim 18, wherein said disposition comprises at least one of a packet drop action, a packet divert action, and/or a packet pass action.

22. The method of claim 21, further comprising determining whether said disposition is to be performed based upon the outcome of said one or more comparisons resulting in a match condition, or whether said disposition is to be performed based upon the outcome of said one or more comparisons resulting in a miss condition.

23. The method of claim 16, further comprising:
determining a priority of said data packet based at least in part upon said categorization vector.

24. A method comprising:
receiving a multi-bit categorization vector representation of a data packet, said categorization vector identifying membership of said data packet in one or more classes of data and one or more subclasses of data;
performing one or more combinatorial operations on said categorization vector to determine whether said data packet satisfies one or more established membership criteria; and
disposing of said data packet based at least in part upon whether said data packet satisfies said established membership criteria.

25. The method of claim 24, wherein said data packet may be disposed at least through a packet drop action, a packet divert action, and a packet pass action.

26. The method of claim 24, wherein determining whether said data packet satisfies one or more established membership criteria comprises performing one or more comparisons of said categorization vector against one or more dynamically programmable Boolean values.

27. The method of claim 22, wherein said categorization vector further identifies a priority membership of said data packet relative to one or more additional packets.

* * * * *